UNITED STATES PATENT OFFICE.

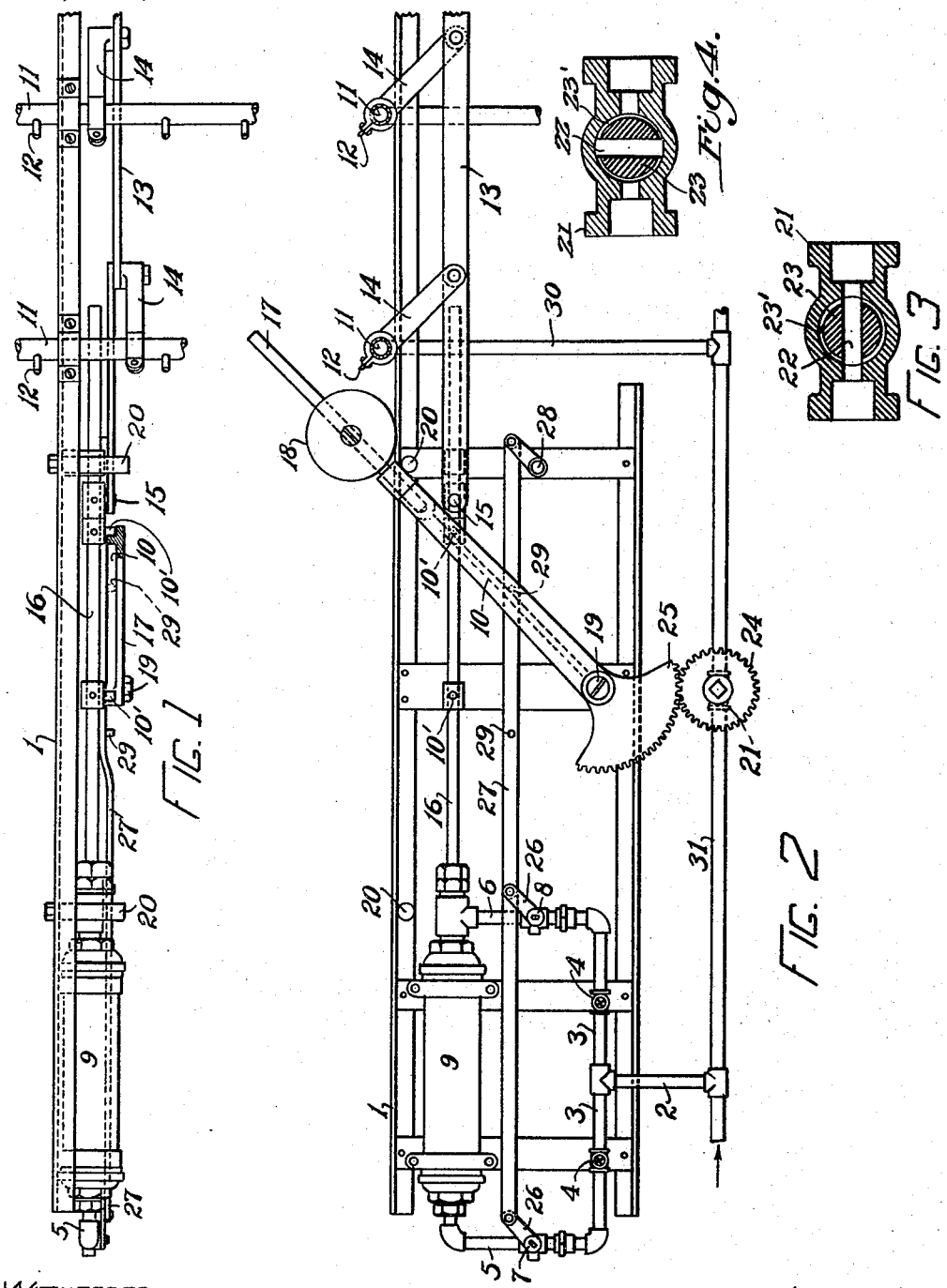

ROY N. STEWART, OF DORCHESTER, MASSACHUSETTS.

SPRAYING APPARATUS.

1,216,746.      Specification of Letters Patent.     Patented Feb. 20, 1917.

Application filed March 22, 1913. Serial No. 756,091.

*To all whom it may concern:*

Be it known that I, ROY N. STEWART, a citizen of the United States, residing at Dorchester, county of Suffolk, Commonwealth of Massachusetts, have invented certain new and useful Improvements in Spraying Apparatus, of which the following is a specification.

This invention relates to water distribution and particularly to an irrigating and sprinkling system.

In the cultivation of some fruits, the cranberry being a notable example, it is essential that the beds be irrigated frequently both for growing, moisture and for frost prevention. The water must also be uniformly distributed and is preferably applied in fine jets in order to get the best results.

Where cultivation is carried on upon an extensive scale and in a scientific manner the ordinary sprinkling devices do not suffice. It is desirable that the sprinkling apparatus be of such a nature as to water comparatively large tracts with a uniform distribution of water and that the apparatus be continuous in its operation so that it may be left unattended for long intervals.

To this end, therefore, I have devised my present invention in which I provide a continuously acting element and a special form of swinging distributing pipes so arranged as to have a predetermined working arc and a uniform water delivery at all points along its travel.

The construction and principle of my invention will be more fully disclosed in the specification which follows and as illustrative of the same I have shown in the accompanying drawings a system which I have found well adapted for the purpose intended. Throughout specification and drawings like characters of reference are employed to indicate corresponding parts and in these drawings:

Figure 1 is a plan view of a sprinkling apparatus in accordance with my invention.

Fig. 2 is a side elevation thereof.

Fig. 3 is a detail section of the supply valve fully open to permit maximum water delivery, and Fig. 4 is a view similar to Fig. 3 showing the valve positioned to permit minimum water delivery.

I have indicated at 1 an open supporting frame to which is secured my improved sprinkling apparatus. A supply pipe 2 delivers to a two-way pipe 3 mounted on the frame and controlled by a pair of check valves 4. To the ends of this pipe are connected branch pipes 5 and 6 controlled by stop and waste valves 7 and 8 and delivering to opposite ends of a double acting hydraulic piston and cylinder 9 mounted on the frame.

Water is supplied in any desired manner as by pipe system 30 to a plurality of spraying pipes 11 having spraying nozzles 12 to divide the stream into jets. Said pipes are mounted for oscillation on the frame 1 by means of a plurality of connected eccentric rods 13 and bell cranks 14. One of said rods 13 is connected by a wrist pin 15 to the shaft 16 of the piston to convert the reciprocal movement thereof into oscillatory movement for the pipes. A lever 17 carrying a weight 18 near its upper end and pivoted at 19 to the frame 1 has a rib 10 positioned for actuation by a pair of pins 10' on the shaft 16. The lever is, therefore, rocked on its pivot by the reciprocation of the shaft, and stops 20 are provided to limit its path of travel.

The admission of water to the supply pipe is controlled by a valve 21 having a passage 22 therein adapted to establish communication between said pipe and a service pipe 31. This valve is actuated by the throw of the lever 17, the valve plug 23 thereof having gear teeth 24 adapted for engagement with the teeth of a segment 25 carried by said lever.

The supply of water to the hydraulic piston is controlled by the stop and waste valves 7 and 8 in the branch pipes 5 and 6 so as to deliver a head of water intermittently to one end of the cylinder 9 and to simultaneously discharge from the other end. The actuation of these valves is also dependent upon the throw of the lever 17, the stems thereof being connected by bell cranks 26 to a rock shaft 27 pivoted at 28 to the frame and provided with a pair of pins 29 positioned for contact in the path of travel of said lever. At every oscillation of the lever 17 by the shaft 16 the rock shaft 27 is given a corresponding actuation in the direction of travel of the lever. This will, therefore, operate the valves 7 and 8 to admit water into one end of the cylinder and to exhaust from the other end according to the direction of throw of the rock shaft. This action is continuous, as is the partial opening and closing of the supply pipe valve 21.

The operation is as follows: Water passes through the pipe 2 into the branch pipes 5 and 6 to the cylinder 9. One of the valves 7 or 8 is set to permit the passage of the water through its pipe and the other to discharge the waste water from the cylinder 9. In this way a head of water is always exerting its pressure against the piston in the cylinder 9.

This reciprocates the shaft 16 and through the connections described, rocks the water distributing pipes 11 and the weighted lever 17 connected to said shaft. This movement of the lever in turn causes the rock shaft 27 to intermittently operate the valves 7 and 8, one to the open, the other to the closed position. At the same time the sector 25 of said lever is engaging the teeth 24 to manipulate the water supply valve 21 to admit, or partially shut off water to the pipes, by means of the annular relief passage 23' around plug 23.

It is obvious that a given nozzle when it approaches the end of its arc will be delivering water in excess of that actually required, while as it approaches its center of highest relative position of swing, the water supplied will be insufficient to thoroughly saturate the ground. This is due to the change in the angle of elevation of the nozzle, that is, the point at which trajectory strikes the ground will move farther from the sprinkler pipe for a given arcual movement of the nozzle, when the nozzle is in an approximately vertical position, than for the same arcual movement when the nozzle approaches a horizontal position. It is therefore necessary that the amount delivered be uniformly proportionate to the relative transverse speed of the nozzle. This I accomplish by so positioning the lever 17 as to fully open the control valve 21 when a spray pipe is approaching its highest relative position of swing, thereby admitting the maximum supply of water, and to partially close said valve when the spray pipe is approaching its lowest relative position of travel, so as to appreciably reduce the quantity of water thus supplied. In this movement of the lever from one pin 20 to the other pin the valve is caused to make a complete revolution. In Fig. 2 the valve has turned to completely close the passage 22. This permits only the minimum amount of water to flow to the delivery pipes through the annular bypass 23' around the valve. As the lever approaches vertical position the valve turns to uncover the passage 22 to permit maximum supply of water to the delivery pipes.

This construction permits the apparatus to be left unattended for long periods of time, since once having been started, its action is automatic.

Various modifications in the form and construction of my invention coming within its spirit and scope may obviously be resorted to if found within the limits of the appended claims.

What I therefore claim and desire to secure by Letters Patent is:

1. In an apparatus of the class described, a fluid supply, an operating element actuated thereby, a fluid delivery, a connection between said operating element and said delivery effective to impart to the latter an oscillatory movement, a variable control for said supply, and a connection between said variable control and said first named connection for varying said control during said oscillatory movement to proportion the volume of fluid supplied according to the position of said delivery relative to the area to be covered.

2. In an apparatus of the class described, a fluid supply, an operating element actuated thereby, a fluid delivery including a plurality of sprinkling devices, a connection between said operating element and said sprinkling devices effective to impart to the latter an oscillatory movement, a variable control for said supply, and a connection between said variable control and said first named connection for varying said control during said oscillatory movement to proportion the volume of fluid supplied according to the position of said delivery relative to the area to be covered.

3. In an apparatus of the class described, a fluid supply, an operating element actuated thereby, a fluid delivery, a reciprocable shaft operatively connecting said operating element and said delivery and effective to impart to the latter an oscillatory movement, a variable control for said supply, and a rock shaft operatively connected with said reciprocable shaft and said control for varying said control during said oscillatory movement.

4. In an apparatus of the class described a fluid supply, an operating element actuated thereby, a fluid delivery operatively connected with said operating element for oscillatory movement in a plane other than the horizontal, and a variable control for said delivery operated thereby and effective to regulate the volume of fluid supplied to said delivery proportionately to variation of its angle of elevation relative to the area to be covered.

5. In an apparatus of the class described a fluid supply, an operating element actuated thereby, a fluid delivery including a plurality of sprinkling devices operatively connected with said operating element for oscillatory movement, a variable control for said delivery, and a lever operatively connecting said control and said delivery effective to regulate the fluid supplied to said delivery proportionately to its relative transverse speed.

6. In an apparatus of the class described, a fluid supply, an operating element actuated thereby, a fluid delivery, a connection between said operating element and said fluid delivery and effective to impart to the latter an oscillatory movement, a variable control for said fluid supply, a lever actuatably disposed relative to said connection, and a rock shaft within the operative influence of said lever to regulate the supply to said operating element, said lever also being operatively connected with said variable control to regulate the fluid supplied to said delivery in proportion to the relative transverse speed of the delivery.

7. In combination, a supply, a delivery oscillated thereby in a vertical plane at a constant speed, and a control operated by the delivery for varying the supply to said delivery whereby to distribute a uniform precipitation on each unit of space covered by said distribution.

8. In combination, a supply, a laterally movable delivery having a variable angle of elevation and oscillated in a vertical plane and at a constant speed by said supply, and a control operated by the delivery for varying the supply to said delivery according to the relative lateral distance of said delivery from its central axis, whereby to distribute a uniform precipitation on each unit of space covered by said distribution.

9. In an apparatus of the class described, a fluid supply, a fluid delivery adapted for vertical oscillation thereby in a vertical plane and at a constant speed, and a variable control operated by said delivery effective to regulate the volume of fluid supplied to said delivery proportionately to the varying positions of said delivery relative to the area to be covered whereby a uniform precipitation on each unit of space covered by said distribution is secured.

10. In an apparatus of the class described, a fluid supply, a fluid delivery adapted for oscillation thereby in a vertical plane and at a constant speed, and a variable control operated by said delivery effective to regulate the volume of fluid supplied to said delivery proportionately as said delivery approaches the relative limits of its arcual movement whereby a uniform precipitation on each unit space covered by said distribution is secured.

11. In an apparatus of the class described, a fluid supply, a fluid delivery adapted for oscillation thereby in a vertical plane and at a constant speed, and a variable control operated by said delivery effective to regulate the volume of fluid supplied to said delivery proportionately to the variation in the angle of elevation of said delivery relative to the area to be covered whereby a uniform precipitation on each unit of space covered by said distribution is secured.

12. In an apparatus of the class described, a fluid supply, an operating element actuated thereby at a constant speed, a fluid delivery operatively connected with said operating element for oscillation thereby in a vertical plane and a variable control for said fluid supply operated by said delivery and effective to regulate the volume of fluid supplied to said operating element proportionately to the varying positions of said delivery relative to the area to be covered.

13. In an apparatus of the class described, a fluid supply, an operating element actuated thereby, a fluid delivery, an operative connection between said operating element and said delivery effective to impart oscillatory movement to said delivery, a variable control for said fluid delivery, and a member operatively associated with said variable control and actuatably disposed relative to said connection between the operating element and the fluid delivery for varying said control proportionately to the varying positions of said fluid delivery.

14. In an apparatus of the class described, a fluid supply, an operating element actuated thereby, a fluid delivery, an operative connection between said operating element and said delivery effective to impart oscillatory movement to said delivery, a variable control for said fluid delivery, a member operatively associated with said variable control and actuatably disposed relative to said connection between the operating element and the fluid delivery for varying said control proportionately to the varying positions of said fluid delivery, and means actuatably disposed relative to said operative connection for controlling the fluid supplied to said operating element.

In testimony whereof I affix my signature in presence of two witnesses.

ROY N. STEWART.

Witnesses:
VICTORIA LOWDEN,
MARION C. HOBBS.

Copies of this patent may be obtained for five cents each, by addressing the "Commissioner of Patents, Washington, D. C."